US010889884B2

(12) United States Patent
Allely et al.

(10) Patent No.: US 10,889,884 B2
(45) Date of Patent: *Jan. 12, 2021

(54) STEEL SHEET COATED WITH A METALLIC COATING BASED ON ALUMINUM

(71) Applicant: ARCELORMITTAL, Luxembourg (LU)

(72) Inventors: Christian Allely, Metz (FR); Tiago Machado Amorim, Longeville les Metz (FR); Joost De Strycker, Zele (BE); Krista Godelieve Oscar Van Den Bergh, Sint-Gillis-Waas (BE)

(73) Assignee: ArcelorMittal, Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 16/359,751

(22) Filed: Mar. 20, 2019

(65) Prior Publication Data
US 2019/0218651 A1 Jul. 18, 2019

Related U.S. Application Data

(63) Continuation of application No. 15/748,033, filed as application No. PCT/IB2016/000977 on Jul. 8, 2016.

(30) Foreign Application Priority Data

Jul. 30, 2015 (WO) ................. PCT/IB2015/001281

(51) Int. Cl.
C23C 2/12 (2006.01)
C23C 2/40 (2006.01)
C23C 2/00 (2006.01)
C22C 21/00 (2006.01)
C23C 2/28 (2006.01)
C21D 8/00 (2006.01)
C22C 38/00 (2006.01)
B32B 15/18 (2006.01)
B32B 15/20 (2006.01)
(Continued)

(52) U.S. Cl.
CPC ................ *C23C 2/12* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *B32B 15/20* (2013.01); *C21D 8/005* (2013.01); *C22C 21/00* (2013.01); *C22C 21/02* (2013.01); *C22C 21/04* (2013.01); *C22C 21/06* (2013.01); *C22C 21/08* (2013.01); *C22C 21/10* (2013.01); *C22C 21/14* (2013.01); *C22C 21/16* (2013.01); *C22C 21/18* (2013.01); *C22C 38/00* (2013.01); *C23C 2/00* (2013.01); *C23C 2/02* (2013.01); *C23C 2/04* (2013.01); *C23C 2/06* (2013.01); *C23C 2/28* (2013.01); *C23C 2/26* (2013.01); *C23C 2/34* (2013.01); *C23C 2/40* (2013.01); *C23C 28/02* (2013.01); *C23C 28/021* (2013.01); *C23C 28/023* (2013.01); *C23C 30/00* (2013.01); *C23C 30/005* (2013.01); *C21D 2211/002* (2013.01); *C21D 2211/005* (2013.01); *C21D 2211/008* (2013.01); *Y10T 428/1275* (2015.01); *Y10T 428/12438* (2015.01);
(Continued)

(58) Field of Classification Search
CPC ....... B32B 15/01; B32B 15/04; B32B 15/043; B32B 15/18; B32B 15/20; B32B 15/013; B32B 15/012; C23C 2/02; C23C 2/04; C23C 2/06; C23C 2/12; C23C 2/26; C23C 2/34; C23C 2/40; C23C 28/02; C23C 28/021; C23C 28/023; C23C 30/00; C23C 2/28; C23C 30/005; C23C 2/00; C22C 21/00; C22C 21/02; C22C 21/04; C22C 21/10; C22C 21/06; C22C 21/08; C22C 21/14; C22C 21/16; C22C 21/18; C22C 38/00; Y10T 428/12736; Y10T 428/1275; Y10T 428/12757; Y10T 428/12764; Y10T 428/12972; Y10T 428/12979; Y10T 428/24967; Y10T 428/2495; Y10T 428/263; Y10T 428/264; Y10T 428/265; Y10T 428/12951; Y10T 428/12438; C21D 8/005; C21D 2211/008; C21D 2211/002; C21D 2211/005
See application file for complete search history.

(56) References Cited

U.S. PATENT DOCUMENTS 6,635,359 B1 10/2003 Kurosaki et al.
7,867,344 B2 1/2011 Kusumi et al.
(Continued)

FOREIGN PATENT DOCUMENTS

CN 104388870 A 3/2015
CN 102791901 B 5/2015
(Continued)

OTHER PUBLICATIONS

Hauger A et al, "Flexibles Walzen Von Tailer Rolled Blanks// Flexible Rolling of Tailor Rolled Blanks", Stahl und Eisen, Verlag Stahleisen, Jan. 1, 2006, pp. 21-23, vol. 126, No. 5, Dusseldorf, DE See English Abstract.
(Continued)

Primary Examiner — Michael E. La Villa
(74) Attorney, Agent, or Firm — Davidson, Davidson & Kappel, LLC

(57) ABSTRACT

A steel sheet with a metallic coating is provided. A composition of the metallic coating includes from 2.0 to 24.0% by weight of zinc, from 7.1 to 12.0% by weight of silicon, optionally from 1.1 to 8.0% by weight of magnesium, and optionally additional elements chosen from Pb, Ni, Zr, or Hf. The content by weight of each additional element is less than 0.3%. A balance of the composition is aluminum, unavoidable impurities and residual elements. A ratio Al/Zn is from 4.0 to 6.0.

11 Claims, 1 Drawing Sheet

(51) Int. Cl.
  *B32B 15/01* (2006.01)
  *B32B 15/04* (2006.01)
  *C22C 21/04* (2006.01)
  *C23C 30/00* (2006.01)
  *C23C 28/02* (2006.01)
  *C22C 21/02* (2006.01)
  *C22C 21/18* (2006.01)
  *C23C 2/04* (2006.01)
  *C23C 2/06* (2006.01)
  *C22C 21/08* (2006.01)
  *C23C 2/02* (2006.01)
  *C22C 21/14* (2006.01)
  *C22C 21/06* (2006.01)
  *C23C 2/26* (2006.01)
  *C23C 2/34* (2006.01)
  *C22C 21/16* (2006.01)
  *C22C 21/10* (2006.01)

(52) U.S. Cl.
  CPC ............... *Y10T 428/12736* (2015.01); *Y10T 428/12757* (2015.01); *Y10T 428/12764* (2015.01); *Y10T 428/12951* (2015.01); *Y10T 428/12972* (2015.01); *Y10T 428/12979* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(56) References Cited

U.S. PATENT DOCUMENTS

| 8,453,482 | B2 | 6/2013 | Maki et al. |
| 9,034,480 | B2 | 5/2015 | Yoshida et al. |
| 9,074,277 | B2 | 7/2015 | Maki et al. |
| 9,234,267 | B2 | 1/2016 | Yoshida et al. |
| 9,296,520 | B2 | 3/2016 | Watakabu |
| 2007/0163685 | A1 | 7/2007 | Kusumi et al. |
| 2007/0271978 | A1 | 11/2007 | Brandstatter et al. |
| 2010/0221572 | A1 | 9/2010 | Laurent et al. |
| 2010/0282373 | A1 | 11/2010 | Van Tol et al. |
| 2010/0319426 | A1 | 12/2010 | Pohl et al. |
| 2011/0274945 | A1 | 11/2011 | Shimoda et al. |
| 2011/0303328 | A1 | 12/2011 | Kondo et al. |
| 2012/0073351 | A1 | 3/2012 | Maki et al. |
| 2012/0085466 | A1 | 4/2012 | Lupp et al. |
| 2012/0085467 | A1 | 4/2012 | Thirion et al. |
| 2012/0135263 | A1 | 5/2012 | Kobayashi et al. |
| 2012/0186705 | A1 | 7/2012 | Sikora et al. |
| 2012/0267012 | A1 | 10/2012 | Sohn et al. |
| 2013/0206824 | A1 | 8/2013 | Wakatabi |
| 2013/0236739 | A1 | 9/2013 | Yoshida et al. |
| 2014/0027026 | A1 | 1/2014 | Schwinghammer et al. |
| 2014/0377584 | A1 | 12/2014 | Hasegawa et al. |
| 2015/0020562 | A1 | 1/2015 | Yamanaka et al. |
| 2015/0191813 | A1 | 7/2015 | Maki et al. |
| 2015/0284861 | A1 | 10/2015 | Allely et al. |
| 2018/0044774 | A1 | 2/2018 | Allely et al. |
| 2018/0195159 | A1 | 7/2018 | Sohn et al. |
| 2018/0216218 | A1 | 8/2018 | Machado Amorim |
| 2018/0223386 | A1* | 8/2018 | Machado Amorim ... C23C 2/40 |
| 2018/0223409 | A1* | 8/2018 | Allely .................. C23C 2/00 |
| 2019/0218651 | A1 | 7/2019 | Allely et al. |
| 2019/0271342 | A1 | 9/2019 | Canourgues et al. |

FOREIGN PATENT DOCUMENTS

| DE | 202012000616 U1 | 2/2012 |
| EP | 1225246 A1 | 7/2002 |
| EP | 2644736 A1 | 10/2013 |
| EP | 2695963 A1 | 2/2014 |
| JP | S46004045 A | 2/1971 |
| JP | H04293759 A | 10/1992 |
| JP | H10176238 A | 6/1996 |
| JP | H11279735 A | 10/1999 |
| JP | 2000104153 A | 4/2000 |
| JP | 2000328216 A | 11/2000 |
| JP | 2001073108 A | 3/2001 |
| JP | 2001115247 A | 4/2001 |
| JP | 2001214280 A | 8/2001 |
| JP | 2002012959 A | 1/2002 |
| JP | 2004339530 A | 12/2004 |
| JP | 2005060728 A | 3/2005 |
| JP | 2005290418 A | 10/2005 |
| JP | 2006051543 A | 2/2006 |
| JP | 2006193776 A | 7/2006 |
| JP | 2006299377 A | 11/2006 |
| JP | 2007182608 A | 7/2007 |
| JP | 2008038168 A | 2/2008 |
| JP | 2008111189 A | 5/2008 |
| JP | 2010070784 A | 4/2010 |
| JP | 2010229483 A | 10/2010 |
| JP | 2010535636 A | 11/2010 |
| JP | 2011152589 A | 8/2011 |
| JP | 2012516939 A | 7/2012 |
| KR | 100317680 B1 | 12/2001 |
| RU | 2466210 C2 | 11/2012 |
| RU | 2544977 C2 | 3/2015 |
| RU | 2553128 C2 | 6/2015 |
| WO | 2010085983 A1 | 8/2010 |
| WO | 2012137687 A1 | 10/2012 |
| WO | 2013122004 A1 | 8/2013 |
| WO | 2013156688 A1 | 10/2013 |
| WO | 2014059475 A1 | 4/2014 |

OTHER PUBLICATIONS

International Search Report issued in connection with International Application No. PCT/182015/001284 dated Apr. 15, 2016.

International Preliminary Report on the Patentability issued in connection with International Application No. PCT/182015/001284 dated Jan. 30, 2018.

International Search Report issued in connection with International Application No. PCT/182016/000983 dated Sep. 15, 2016.

International Preliminary Report on the Patentability issued in connection with International Application No. PCT/182016/000983 dated Dec. 12, 2017.

* cited by examiner

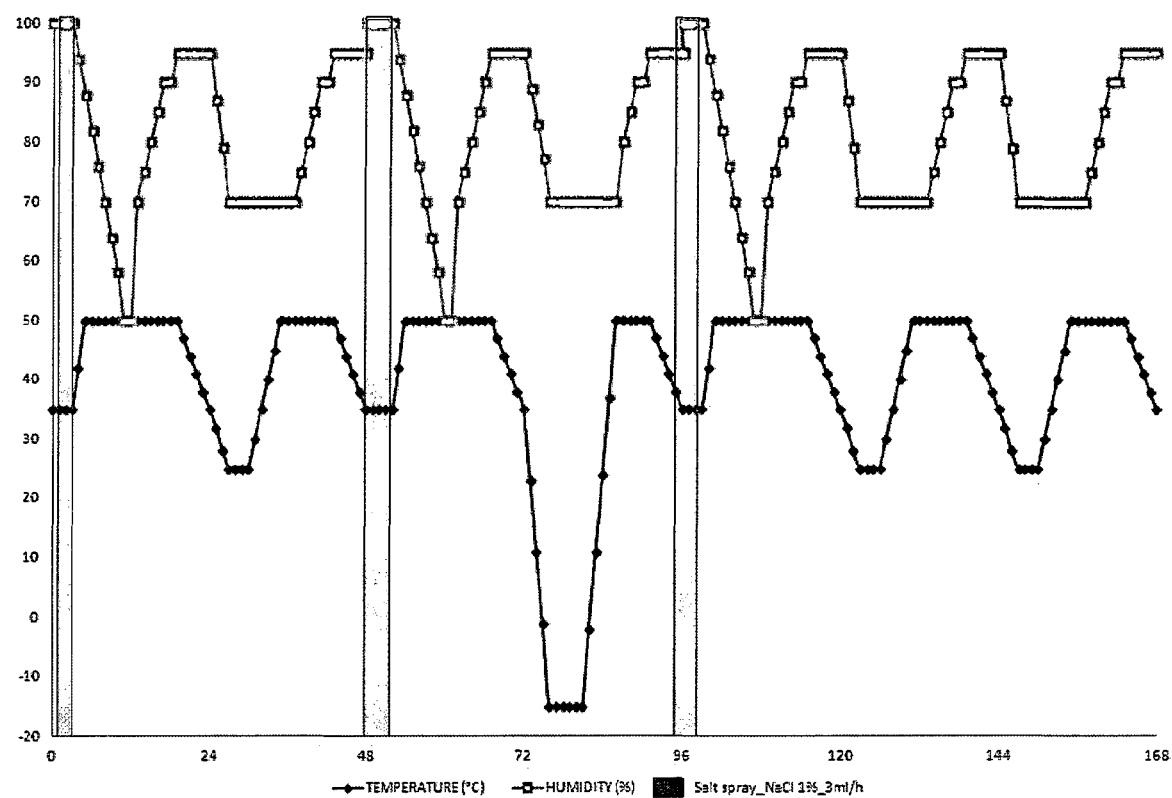

STEEL SHEET COATED WITH A METALLIC COATING BASED ON ALUMINUM

This is a continuation of U.S. Ser. No. 15/748,033, filed Jan. 26, 2018 which is a National Phase Application of PCT/IB2016/000977, filed Jul. 8, 2016 which claims priority to PCT/IB2015/001281, filed Jul. 30, 2015, the entire disclosures of which are hereby incorporated by reference herein.

The present invention relates to a steel sheet coated with a metallic coating. The invention is particularly well suited for the manufacture of automotive vehicles.

BACKGROUND

Zinc-based coatings are generally used because they allows for a protection against corrosion thanks to barrier protection and cathodic protection. The barrier effect is obtained by the application of a metallic coating on steel surface. Thus, metallic coatings prevent the contact between steel and corrosive atmosphere. The barrier effect is independent from the nature of coating and substrate. On the contrary, sacrificial cathodic protection is based on the fact that zinc is a metal less noble that steel. Thus, if corrosion occurs, zinc is consumed preferentially to steel. Cathodic protection is essential in areas where steel is directly exposed to corrosive atmosphere, like cut edges where surrounding zinc will be consumed before steel.

However, when press hardening process is performed on such zinc coated steel sheets, for example by hot-stamping, microcracks are observed in steel which spread from the coating. Additionally, the step of painting of some hardened parts coated with zinc necessitates sanding operations before phosphatation due to the presence of a weak layer of oxides at the part surface.

Other metallic coatings usually used for the production of automotive vehicle are aluminum and silicon based coatings. There is no microcrack in steel when press hardening process is performed due to the presence of an intermetallic layer Al—Si—Fe. Moreover, they have a good aptitude for painting. They allow for a protection by barrier effect and can be welded. However, they do not allow for a cathodic protection or they have a very low cathodic protection.

The patent application EP1225246 discloses a Zn—Al—Mg—Si alloy-plated material wherein the coating comprises, in terms of weight %, Al: at least 45% and no greater than 70%, Mg: at least 3% and less than 10%, Si: at least 3% and less than 10%, with the remainder Zn and unavoidable impurities, wherein the Al/Zn ratio is 0.89-2.75 and the plating layer contains a bulky $Mg_2Si$ phase. It also discloses a Zn—Al—Mg—Si alloy-plated steel material wherein the coating comprises, in terms of weight %, Al: at least 45% and no greater than 70%, Mg: at least 1% and less than 5%, Si: at least 0.5% and less than 3%, with the remainder Zn and unavoidable impurities, wherein the Al/Zn ratio is 0.89-2.75 and the plating layer contains a scaly $Mg_2Si$ phase. These specific coatings show unpainted corrosion resistance and edge creep resistance at cut edge sections after painting.

However, the fabrication of specific $Mg_2Si$ phases, scaly or bulky, is complex. Indeed, it depends on the size and on the ratio of the short diameter mean size with respect to the long diameter of $Mg_2Si$ phases, as observed with a 5° polished cross-section. The size is affected most predominantly by the cooling rate after hot-dip plating. Moreover, the fabrication of $Mg_2Si$ phases also depends on the quantity of Mg and Si.

From an industrial point of view, $Mg_2Si$ phases can be difficult to obtain because of these specifics criteria. Therefore, there is a risk that the desired $Mg_2Si$ phase is not obtained.

SUMMARY OF THE INVENTION

An object of the invention is to provide a coated steel sheet easy to form having a reinforced protection against corrosion, i.e. a sacrificial cathodic protection in addition to barrier protection, before and after the forming.

In terms of sacrificial protective corrosion, electrochemical potential has to be at least 50 mV more negative than the potential of steel, i.e. a maximum potential of −0.78V with respect to a saturated calomel electrode (SCE). It is preferable not to decrease the potential at a value of −1.4V/SCE, even −1.25V/SCE which would involve a fast consumption and would finally decrease the period of protection of steel.

The present invention provides a steel sheet coated with a metallic coating comprising from 2.0 to 24.0% by weight of zinc, from 7.1 to 12.0% by weight of silicon, optionally from 1.1 to 8.0% by weight of magnesium, and optionally additional elements chosen from Pb, Ni, Zr, or Hf, the content by weight of each additional element being less than 0.3% by weight, the balance being aluminum and optionally unavoidable impurities and residuals elements, wherein the ratio Al/Zn is above 2.9.

The invention also provides parts made from the steel sheet coated with the metallic.

The invention further provides a coated part for the manufacture of an automotive.

BRIEF DESCRIPTION OF THE DRAWING

To illustrate the invention, various embodiments and trials of non-limiting examples will be described, particularly with reference to the following FIGURE:

FIG. 1 illustrates one corrosion cycle corresponding to 168 hours of the norm VDA 233-102.

DETAILED DESCRIPTION

Other characteristics and advantages of the invention will become apparent from the following detailed description of the invention.

Any steel can be advantageously used in the scope of the invention. However, in case steel having high mechanical strength is needed, in particular for parts of structure of automotive vehicle, steel having a tensile resistance superior to 500 MPa, advantageously between 500 and 2000 MPa before or after heat-treatment, can be used. The weight composition of steel sheet is preferably as follows: $0.03\% \leq C \leq 0.50\%$; $0.3\% \leq Mn \leq 3.0\%$; $0.05\% \leq Si \leq 0.8\%$; $0.015\% \leq Ti \leq 0.2\%$; $0.005\% \leq Al \leq 0.1\%$; $0\% \leq Cr \leq 2.50\%$; $0\% \leq S \leq 0.05\%$; $0\% \leq P \leq 0.1\%$; $0\% \leq B \leq 0.010\%$; $0\% \leq Ni \leq 2.5\%$; $0\% \leq Mo \leq 0.7\%$; $0\% \leq Nb \leq 0.15\%$; $0\% \leq N \leq 0.015\%$; $0\% \leq Cu \leq 0.15\%$; $0\% \leq Ca \leq 0.01\%$; $0\% \leq W \leq 0.35\%$, the balance being iron and unavoidable impurities from the manufacture of steel.

For example, the steel sheet is 22MnB5 with the following composition: $0.20\% \leq C \leq 0.25\%$; $0.15\% \leq Si \leq 0.35\%$; $1.10\% \leq Mn \leq 1.40\%$; $0\% \leq Cr \leq 0.30\%$; $0\% \leq Mo \leq 0.35\%$; $0\% \leq P \leq 0.025\%$; $0\% \leq S \leq 0.005\%$; $0.020\% \leq Ti \leq 0.060\%$; $0.020\% \leq Al \leq 0.060\%$; $0.002\% \leq B \leq 0.004\%$, the balance being iron and unavoidable impurities from the manufacture of steel.

The steel sheet can be Usibor® 2000 with the following composition: 0.24%≤C≤0.38%; 0.40%≤Mn≤3%; 0.10%≤Si≤0.70%; 0.015%≤Al≤0.070%; 0%≤Cr≤2%; 0.25%≤Ni 2%; 0.020%≤Ti≤0.10%; 0%≤Nb≤0.060%; 0.0005%≤B≤0.0040%; 0.003%≤N≤0.010%; 0.0001%≤S≤0.005%; 0.0001%≤P≤0.025%; it being understood that the contents of titanium and nitrogen satisfy Ti/N>3.42; and that the contents of carbon, manganese, chromium and silicon satisfy:

$$2.6C + \frac{Mn}{5.3} + \frac{Cr}{13} + \frac{Si}{15} \geq 1.1\%$$

the composition optionally comprising one or more of the following: 0.05%≤Mo≤0.65%; 0.001%≤W≤0.30%; 0.0005%≤Ca≤0.005%, the balance being iron and unavoidable impurities from the manufacture of steel.

For example, the steel sheet is Ductibor® 500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni 0.100%; 0%≤Cr≤0.100%; 0%≤Mo≤0.100%; 0%≤Ca≤0.006%, the balance being iron and unavoidable impurities from the manufacture of steel.

Steel sheet can be obtained by hot rolling and optionally cold rolling depending on the desired thickness, which can be for example between 0.7 and 3.0 mm.

The invention provides a steel sheet coated with a metallic coating comprising from 2.0 to 24.0% by weight of zinc, from 7.1 to 12.0% by weight of silicon, optionally from 1.1 to 8.0% by weight of magnesium, and optionally additional elements chosen from Pb, Ni, Zr, or Hf, the content by weight of each additional element being less than 0.3% by weight, the balance being aluminum and optionally unavoidable impurities and residuals elements, wherein the ratio Al/Zn is above 2.9. Metallic coatings according to the invention have a high sacrificial protection.

Preferably, the metallic coating does not comprise elements selected among Cr, Mn, Ti, Ce, La, Nd, Pr, Ca, Bi, In, Sn and Sb or their combinations. In another preferred embodiment, the metallic coating does not comprise any of the following compounds: Cr, Mn, Ti, Ce, La, Nd, Pr, Ca, Bi, In, Sn and Sb. Indeed, without willing to be bound by any theory, it seems that when these compounds are present in the coating, there is a risk that the properties of the coating, such as electrochemical potential, are altered, because of their possible interactions with the essential elements of the coatings.

Preferably, the ratio Al/Zn is below or equal to 8.5. Preferably, the ratio Al/Zn is between 3.0 and 7.5, advantageously between 4.0 and 6.0. Without willing to be bound by any theory, it seems that if these conditions are not met, there is a risk that the sacrificial protection decreases because zinc rich phases are not in sufficient amount in the coating.

In a preferred embodiment, the coating layer further comprises an Al—Zn phase.

Advantageously, the metallic coating comprises from 10.0 to 20.0%, preferably from 10.0 to 15.0%, by weight of zinc.

Preferably, the metallic coating comprises from 8.1 to 10.0% by weight of silicon.

Advantageously, the coating comprises from 3.0 to 8.0% by weight of magnesium, preferably, from 3.0 to 5.0% by weight of magnesium. Without willing to be bound by any theory, it has been found that the addition of magnesium in the above range further improve the anti-corrosion properties.

Preferably, the microstructure of said coating comprising a $Mg_2Si$ phase. In another preferred embodiment, the microstructure of said coating further comprises a $MgZn_2$ phase.

Advantageously, the amount of aluminum is above 71%, preferably above 76%, by weight.

The coating can be deposited by any methods known to the man skilled in the art, for example hot-dip galvanization process, electrogalvanization process, physical vapour deposition such as jet vapor deposition or sputtering magnetron. Preferably, the coating is deposited by hot-dip galvanization process. In this process, the steel sheet obtained by rolling is dipped in a molten metal bath.

The bath comprises zinc, silicon, aluminum and optionally magnesium. It can comprise additional elements chosen from Pb, Ni, Zr, or Hf, the content by weight of each additional element being less than 0.3% by weight. These additional elements can improve among others ductibility, coating adhesion on the steel sheet.

The bath can also contain unavoidable impurities and residuals elements from feeding ingots or from the passage of the steel sheet in the molten bath. Residual element can be iron with a content up to 3.0% by weight.

The thickness of the coating is usually between 5 and 50 μm, preferably between 10 and 35 μm, advantageously between 12 and 18 μm or between 26 to 31 μm. The bath temperature is usually between 580 and 660° C.

After the deposition of the coating, the steel sheet is usually wiped with nozzles ejecting gas on both sides of the coated steel sheet. The coated steel sheet is then cooled. Preferably, the cooling rate is above or equal to 15° $C.s^{-1}$ between the beginning of the solidification and the end of the solidification. Advantageously, the cooling rate between the beginning and the end of the solidification is superior or equal to 20° $C.s^{-1}$.

Then, a skin-pass can be realized and allows work hardening the coated steel sheet and giving it a roughness facilitating the subsequent shaping. A degreasing and a surface treatment can be applied in order to improve for example adhesive bonding or corrosion resistance.

Then, the coated steel sheet according to the invention can be shaped by any method known to the man skilled in the art, for example cold-stamping and/or hot-forming.

In a preferred embodiment, the part is obtained by cold-stamping. In this case, the coated steel sheet is cut to obtain a blank and then cold-stamped in order to obtain a part.

In another preferred embodiment, the part coated is obtained by a press hardening process including the hot-forming. In this case, this method comprises the following steps:

A) the provision of a steel sheet pre-coated with a metallic coating comprising from 2.0 to 24.0% by weight of zinc, from 7.1 to 12.0% by weight of silicon, optionally from 1.1 to 8.0% by weight of magnesium, and optionally additional elements chosen from Pb, Ni, Zr, or Hf, the content by weight of each additional element being less than 0.3% by weight, the balance being aluminum and unavoidable impurities and residuals elements, wherein the ratio Al/Zn is above 2.9, B) the cutting of the coated steel sheet to obtain a blank, C) the thermal treatment of the blank at a temperature between 840 and 950° C. to obtain a fully austenitic microstructure in the steel,
D) the transfer of the blank into a press tool,
E) the hot-forming of the blank to obtain a part,
F) the cooling of the part obtained at step E) in order to obtain a microstructure in steel being martensitic or martensito-bainitic or made of at least 75% of equiaxed ferrite, from 5 to 20% of martensite and bainite in amount less than or equal to 10%.

Indeed, after, the provision of steel sheet pre-coated with the metallic coating according to the present invention the cutting to obtain a blank. A thermal treatment is applied to the blank in a furnace under non protective atmosphere at an austenitization temperature Tm usually between 840 and 950° C., preferably 880 to 930° C. Advantageously, said blank is maintained during a dwell time tm between 1 to 12 minutes, preferably between 3 to 9 minutes. During the thermal treatment before the hot-forming, the coating forms an alloy layer having a high resistance to corrosion, abrasion, wear and fatigue.

After the thermal treatment, the blank is then transferred to a hot-forming tool and hot-formed at a temperature between 600 and 830° C. The hot-forming comprises the hot-stamping and the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

A coated part according to the invention can thus obtained by cold or hot forming but also by any suitable combination of cold-stamping and hot-forming.

In a preferred embodiment, the part is a press hardened steel part having a variable thickness, i.e. the press hardened steel part of the invention can have a thickness which is not uniform but which can vary. Indeed, it is possible to achieve the desired mechanical resistance level in the zones which are the most subjected to external stresses, and to save weight in the other zones of the press hardened part, thus contributing to the vehicle weight reduction. In particular, the parts with non-uniform thickness can be produced by continuous flexible rolling, i.e. by a process wherein the sheet thickness obtained after rolling is variable in the rolling direction, in relationship with the load which has been applied through the rollers to the sheet during the rolling process.

Thus, within the conditions of the invention, it is possible to manufacture advantageously vehicle parts with varying thickness in order to obtain for example a tailored rolled blank. Specifically, the part can be a front rail, a seat cross member, a side sill member, a dash panel cross member, a front floor reinforcement, a rear floor cross member, a rear rail, a B-pillar, a door ring or a shotgun.

For automotive application, after phosphating step, the part is dipped in an e-coating bath. Usually, the thickness of the phosphate layer is between 1 and 2 μm and the thickness of the e-coating layer is between 15 and 25 μm, preferably less than or equal to 20 μm. The cataphoresis layer ensures an additional protection against corrosion.

After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention will now be explained in trials carried out for information only. They are not limiting.

EXAMPLES

For all samples, steel sheets used are 22MnB5. The composition of the steel is as follows: C=0.2252%; Mn=1.1735%; P=0.0126%, S=0.0009%; N=0.0037%; Si=0.2534%; Cu=0.0187%; Ni=0.0197%; Cr=0.180%; Sn=0.004%; Al=0.0371%; Nb=0.008%; Ti=0.0382%; B=0.0028%; Mo=0.0017%; As=0.0023% and V=0.0284%.

All coatings were deposited by hot-dip galvanization process. All coatings have a thickness of 15 μm.

Example 1: Cut Edge Potential Test

Trials 1 to 4 were prepared and subjected to an electrochemical potential test.

A test consisting in measuring the cut edges potential of coated steel sheet was realized. To this end, each steel sheet was dipped in a solution comprising 2.43% by weight of sodium sulfate and 0.1% by weight of sodium chloride. A saturated calomel electrode (SCE) was also immersed into the solution. The coupling potential of cut edges was measured. Results are shown in the following Table 1:

| Trials | Coating | | | | Thickness | Coupling |
| --- | --- | --- | --- | --- | --- | --- |
|  | Al | Si | Zn | Mg | (μm) | potential(V/SCE) |
| 1* | 81 | 9 | 10 | — | 15 | −0.84 |
| 2* | 77 | 9 | 10 | 4 | 15 | −0.84 |
| 3* | 73 | 9 | 10 | 8 | 15 | −0.84 |
| 4 | 91 | 9 | — | — | 15 | −0.625 |

*examples according to the invention.

Trials according to the invention (Trials 1 to 3) have a lower coupling potential than a coating comprising aluminum and 9% by weight of silicon. Coupling potentials of Trials 1 to 3 are under −0.78V/SCE as required.

Example 2: Cut Edge Corrosion Test

Trials 5 to 12 were prepared and subjected to a corrosion test to evaluate the cut edge protection of the coated steel sheets.

All trials were dipped in a solution comprising 2.43% by weight of sodium sulfate and 0.1% by weight of sodium chloride during 50 hours. The presence of corrosion on cut edges of coated steel sheet was observed with the naked eye: 0 means excellent, in other words, there is little or no corrosion and 5 means very bad, in other words, there are is a lot of corrosion on the cut edges. Results are shown in the following Table 2:

| Trials | Coating | | | | Thickness | Corrosion |
|---|---|---|---|---|---|---|
| | Al | Si | Zn | Mg | (μm) | |
| 5* | 86 | 9 | 5 | — | 15 | 2 |
| 6* | 81 | 9 | 10 | — | 15 | 1.5 |
| 7* | 71 | 9 | 20 | — | 15 | 1 |
| 8* | 77 | 9 | 10 | 4 | 15 | 0 |
| 9* | 73 | 9 | 10 | 8 | 15 | 0 |
| 10* | 67 | 9 | 20 | 4 | 15 | 0 |

-continued

| Trials | Coating | | | | Thickness | Corrosion |
|---|---|---|---|---|---|---|
| | Al | Si | Zn | Mg | (μm) | |
| 11* | 63 | 9 | 20 | 8 | 15 | 0 |
| 12 | 91 | 9 | — | — | 15 | 5 |

*examples according to the invention.

Trials 5 to 11 have very good protection against corrosion on the cut edges of coated steel sheet. By contrast, Trial 12 does not show enough corrosion resistance on the cut edges.

Example 3: Electrochemical Behavior Test

Trials 13 to 16 were prepared and subjected to an electrochemical potential test.

A test consisting in measuring the electrochemical potential of the coated steel surface sheet was realized. Steel sheets and coatings were separated and dipped in a solution comprising 5% by weight of sodium chloride at pH 7. A saturated calomel electrode (SCE) was also immersed into the solution. The coupling potential of the surface was measured over time. Results are shown in the following Table 3:

| Trials | Coating | | | | Thickness | Coupling |
|---|---|---|---|---|---|---|
| | Al | Si | Zn | Mg | (μm) | potential (V/SCE) |
| 13* | 81 | 9 | 10 | — | 15 | −0.98 |
| 14* | 77 | 9 | 10 | 4 | 15 | −0.98 |
| 15* | 73 | 9 | 10 | 8 | 15 | −0.99 |
| 16 | 0.2 | — | 99.8 | — | 7 | −1.00 |

*examples according to the invention.

Trials 13 to 15 are sacrificial such as zinc coating. Coupling potential are under −0.78V/SCE as required.

Example 4: Corrosion Test

Trials 17 to 20 were prepared and subjected to a corrosion test to evaluate the protection of the coated steel sheets.

A test, consisting in submitting coated steel sheet to corrosion cycles according to the norm VDA 233-102, was realized. At this end, trials were put in a chamber wherein an aqueous solution of sodium chloride of 1% by weight was vaporized on trials with a rate of flow of 3 mL·h$^{-1}$. The temperature varied from 50 to −15° C. and the humidity rate varied from 50 to 100%. FIG. 1 illustrates one cycle corresponding to 168 hours, i.e. one week.

The presence of corrosion on coated steel sheet was observed by naked eyes: 0 means excellent, in other words, there is little or no corrosion and 5 means very bad, in other words, there is a lot of corrosion. Results are shown in the following Table 4:

| Trials | Coating | | | | Thickness | Number of cycles | | | | | |
|---|---|---|---|---|---|---|---|---|---|---|---|
| | Al | Si | Zn | Mg | (μm) | 1 | 5 | 7 | 10 | 15 | 20 |
| 17* | 81 | 9 | 10 | — | 15 | 0 | 0 | 0.5 | 1 | 3 | 4 |
| 18* | 77 | 9 | 10 | 4 | 15 | 0 | 0 | 0 | 0 | 0 | 0 |
| 19* | 73 | 9 | 10 | 8 | 15 | 0 | 0 | 0 | 0 | 0 | 0 |
| 20 | 0.2 | — | 99.8 | — | 7 | 0 | 2 | 4 | ND | ND | ND |

*examples according to the invention,
ND: not done.

Trials 17 to 19 show excellent protection against corrosion, in particular when the coating comprises magnesium (Trials 18 and 19).

Example 5: Corrosion Test on Scratched Trials

Trials 21 to 24 were prepared and subjected to a corrosion test to evaluate the protection of the coated steel sheets.

Firstly, all trials were scratched on a width of 0.5, 1 and 2 mm. then, all trials were submitted to corrosion cycles according to the norm VDA 233-102 represented in FIG. 1.

The presence of corrosion on coated steel sheet around scratches was observed by naked eyes: 0 means excellent, in other words, there is little or no corrosion around scratch and 5 means very bad, in other words, there is a lot of corrosion around scratch. Results are shown in the following Table 5:

| Trials | Coating | | | | Thickness (μm) | Number of cycles | | | | | |
|---|---|---|---|---|---|---|---|---|---|---|---|
| | Al | Si | Zn | Mg | 15 | 1 | 2 | 3 | 4 | 5 | 6 |
| 21* | 81 | 9 | 10 | — | 15 | 0 | 0 | 0.5 | 1 | 2 | 3 |
| 22* | 77 | 9 | 10 | 4 | 15 | 0 | 0 | 0 | 0 | 0 | 0 |
| 23* | 73 | 9 | 10 | 8 | 15 | 0 | 0 | 0 | 0 | 0 | 0.5 |
| 24 | 0.2 | — | 99.8 | — | 10 | 0 | 0 | 0 | 1 | 2 | 3 |

*examples according to the invention.

Trials according to the invention (Trials 21 to 23) have an excellent protection against corrosion, in particular when the coating comprises magnesium (Trial 22 and 23).

Example 6: Corrosion Test on Heat Treated and Scratched Trials

Trials 25 to 28 were prepared and subjected to a corrosion test to evaluate the protection of the coated steel sheets after austenitization treatment.

All trials were cut in order to obtain a blank. Blanks were then heated at a temperature of 900° C. during a dwell time varying between 5 and 10 minutes. Blanks were transferred into a press tool and hot-stamped in order to obtain parts. Then, parts were cooled to obtain a hardening by martensitic transformation. All trials were submitted to 6 corrosion cycles according to the norm VDA 233-102 represented in FIG. 1.

The presence of corrosion on coated steel sheet around scratches was observed by naked eyes: 0 means excellent, in other words, there is little or no corrosion around scratch and 5 means very bad, in other words, there is a lot of corrosion around scratch. Results are shown in the following Table 6:

| Trials | Coating | | | | Thickness | Dwell time (min) | |
|---|---|---|---|---|---|---|---|
| | Al | Si | Zn | Mg | (μm) | 5 | 10 |
| 25* | 71 | 9 | 20 | — | 15 | 1 | 1 |
| 26* | 77 | 9 | 10 | 4 | 15 | 0.5 | 0.5 |
| 27* | 73 | 9 | 10 | 8 | 15 | 2 | 3 |
| 28 | 91 | 9 | — | — | 15 | 5 | 5 |

*examples according to the invention.

Trials 25 to 27 show good protection against corrosion compared to the coating comprising aluminum and silicon (Trial 28).

Example 7: Electrochemical Behavior Test

Trials 29 to 40 were prepared and subjected to an electrochemical potential test after austenitization treatment.

All trials were cut in order to obtain a blank. Blanks were then heated at a temperature of 900° C. during a dwell time of 5 minutes. Blanks were transferred into a press tool and hot-stamped in order to obtain parts. Then, parts were cooled to obtain a hardening by martensitic transformation.

A test consisting in measuring the electrochemical potential of the coated steel surface sheet was realized. Steel sheets and coatings were separated and dipped in a solution comprising 5% by weight of sodium chloride at pH 7. A saturated calomel electrode (SCE) was also immersed into the solution. The power of sacrificial protection, also called galvanic coupling, was measured over time. In other words, it has been assessed how long the coating remains sacrificial in these conditions. Results are shown in the following Table 7:

| Trials | Coating | | | | Thickness | Galvanic coupling |
|---|---|---|---|---|---|---|
| | Al | Si | Zn | Mg | (μm) | (hours) |
| 29 | 88 | 2 | 10 | — | 15 | 0 |
| 30 | 83 | 2 | 15 | — | 15 | 0 |
| 31 | 80 | 5 | 15 | — | 15 | 0 |
| 32* | 81 | 9 | 10 | — | 15 | 16 |
| 33* | 77 | 9 | 10 | 4 | 15 | 45 |
| 34* | 73 | 9 | 10 | 8 | 15 | 7 |
| 35* | 76 | 9 | 15 | — | 15 | 26 |
| 36* | 83 | 9 | 15 | 2 | 15 | 84 |
| 37* | 71 | 9 | 20 | — | 15 | 140 |
| 38* | 67 | 9 | 20 | 4 | 15 | 91 |
| 39* | 63 | 9 | 20 | 8 | 15 | 14 |
| 40 | 91 | 9 | — | — | 15 | 0 |

*examples according to the invention.

Trials 32 to 39 according to the present invention are and remain sacrificial protection over time.

What is claimed is:

1. A steel sheet coated with a metallic coating, the metallic coating comprising:
   10 to 20% by weight of zinc;
   7.1 to 12.0% by weight of silicon;
   1.1 to 8.0% by weight of magnesium;
   optionally additional elements chosen from Pb, Ni, Zr, or Hf, a content by weight of each additional element of the additional elements if present being less than 0.3% by weight; and
   a balance being aluminum and unavoidable impurities and residuals elements, a weight ratio of Al/Zn being from 4.0 to 6.0; the coating not including Sn and not including In;
   wherein a microstructure of the coating includes an Al—Zn phase, a $Mg_2Si$ phase, and a $MgZn_2$ phase and wherein a thickness of the coating is between 10 and 35 μm.

2. The steel sheet according to claim 1, wherein the coating comprises from 10.0 to 15.0% by weight of zinc.

3. The steel sheet according to claim 1, wherein the coating comprises from 8.1 to 10.0% by weight of silicon.

4. The steel sheet according to claim 1, wherein the coating comprises from 3.0 to 8.0% by weight of magnesium.

5. The steel sheet according to claim 4, wherein the coating comprises from 3.0 to 5.0% by weight of magnesium.

6. The steel sheet according to claim 1, wherein an amount of the aluminum is greater than 71% by weight.

7. The steel sheet according to claim 1, wherein an amount of the aluminum is greater than 76% by weight.

8. The steel sheet according to claim 1, wherein the thickness of the coating is between 12 and 18 μm.

9. The steel sheet according to claim 1, wherein the thickness of the coating is between 26 and 31 μm.

10. The steel sheet according to claim 1, wherein the coating further does not include any elements selected from Cr, Mn, Ti, Ce, La, Nd, Pr, Ca, Bi, and Sb or their combinations.

11. The steel sheet according to claim 1, wherein the steel sheet is 22MnB5 steel.

* * * * *